United States Patent Office 3,279,884
Patented Oct. 18, 1966

3,279,884
SELECTIVE REMOVAL OF OXIDES OF NITROGEN FROM GAS MIXTURES CONTAINING OXYGEN
Helmut Nonnenmacher, Ludwigshafen (Rhine), and Klaus Kartte, Frankenthal, Pfalz, Germany, assignors to Badische Anilin- & Soda-Fabrik, Aktiengesellschaft, Ludwigshafen (Rhine), Rhineland-Pfalz, Germany
No Drawing. Filed Sept. 21, 1964, Ser. No. 398,055
Claims priority, application Germany, Oct. 31, 1963, B 74,081
4 Claims. (Cl. 23—2)

This invention relates to the selective removal of oxides of nitrogen from gas mixtures containing oxygen.

Owing to incomplete reaction, the waste gases resulting from the production of nitric acid by oxidation of ammonia contain about 0.1 to 0.5% by volume of nitrogen monoxide (NO) and nitrogen dioxide ($NO_2$) which are undesirable because of their corrosive action and from the point of view of air pollution.

It is known that in the catalytic reduction of nitrogen oxides with fuels, such as hydrogen, carbon monoxide, methane or other saturated or unsaturated hydrocarbons, the oxygen is also removed (U.S. patent specification No. 3,118,727). Not only does this cause a higher consumption of fuel, but the very large amount of heat produced by the removal of the oxygen leads to early damage to the catalyst and diminution of its activity.

It is further known that nitrogen oxides will react selectively with ammonia and the presence of oxygen does not interfere with this. Metals of the platinum group (palladium, rhodium, ruthenium or platinum) as described in U.S. patent specification No. 2,975,025, or metals of the iron group (cobalt, nickel or iron) as described in U.S. patent specification No. 3,008,796 may be used for the purpose. To prolong the life of the catalysts, when using platinum metal catalysts, it has been proposed to reduce the nitrogen dioxide fraction of the nitrous waste gas (which after some time causes bleaching of the catalyst) partially into nitrogen monoxide in a first stage with hydrogen, carbon monoxide, acetylene or ethylene in contact with a ruthenium catalyst, and then to react it with ammonia, preferably in the presence of a platinum catalyst (British patent specification No. 918,300). The use of metals of the platinum group or iron group has the disadvantage that these metals, particularly those of the platinum group, undergo a change which is still not understood and which results in a loss of activity, after some time in the presence of ammonia and nitrogen dioxide.

We have now found that the said disadvantage does not arise when oxides of vanadium, molybdenum and/or tungsten are used as catalysts. It is preferred to use catalysts containing vanadium (V) oxide, molybdenum (VI) oxide and/or tungsten (VI) oxide.

The catalysts may be used with advantage in the form of supported catalysts which contain 2 to 50% of their total weight as oxides of vanadium, molybdenum and/or tungsten. Aluminum oxide and/or silicic acid may advantageously be used as carriers for the catalyst.

The process according to this invention is very selective in relation to removal of nitrogen oxides without simultaneous removal of oxygen. It has the advantage that the nitrogen dioxide content of the gas mixture has no injurious effect on the catalysts and therefore their life is not impaired. Moreover the vanadium oxide catalysts are not sensitive to sulfur.

The supported catalysts may be prepared by any suitable method, for example by impregnating the carrier in the form of a molding one or more times with a solution of a vanadium salt (for example a solution of vanadium oxysulfate, or a solution of vanadium (V) oxide in oxalic acid), or a solution of ammonium molybdate or tungstate, drying and heating in a current of air for several hours at a temperature of from about 450° to 600° C., so that the corresponding metal oxide is formed from the salt. The metal oxide may then be converted into an equally active lower oxidation stage (for example $V_2O_3$, $WO_2$ or $MO_2O_3$) by subsequent prolonged heating in a current of hydrogen at 400° to more than 650° C.

The gas mixtures used as initial products are preferably waste gases occurring in the production of nitric acid from ammonia or in nitration processes and which contain for example 0 to 15% by volume of oxygen, 0 to 2% by volume of nitrogen monoxide, 0 to 2% by volume of nitrogen dioxide, the remainder being an inert gas, for example nitrogen, and which may have a water-vapor content of 0.01 up to about 5% by volume.

For selective removal of more than 90% of the nitrogen oxides, the amount of ammonia which it is necessary to add is advantageously in the range from the amount equivalent to the nitrogen oxides content to three times that amount; it is preferred to use from one to one and one half times the said amount. It is economically advantageous to use the amount of ammonia which is just sufficient for substantial removal of the nitrogen oxides. To remove the nitrogen oxides, the gas mixture containing ammonia is passed at space velocities of about 3,000 to 80,000, preferably about 10,000 to 30,000 parts by volume (S.T.P.) of gas mixture per hour per part by volume of catalyst over the catalyst. The temperature of the gas upon admission is 150° to 400° C., preferably 200° to 350° C. The pressure may be in the range from atmospheric pressure to about 20 atmospheres gauge.

The following examples further illustrate how the process according to this invention may be carried out.

EXAMPLE 1

A gas mixture consisting of 96.1% of nitrogen, 3.5% of oxygen and 0.43% of nitrogen monoxide is allowed to flow in admixture with 0.43% of ammonia (one and one half times the NO equivalent) at a rate of 100 liters per hour over 10 ccm. of a vanadium oxide-corundum catalyst (3.6 mm. extruded pieces with 6.8% of $V_2O_5$). At a temperature of the gas mixture of 258° C. prior to the reduction, the nitrogen oxides are practically completely removed (99.2%). A NO removal of 97.5% is achieved at 220° C. and of 88.9% at 177° C. The rise in temperature in the catalyst caused by the reaction is about 35° C.

EXAMPLE 2

The gas mixture described in the preceding example, with 0.86% of ammonia (three times the NO equivalent) is reacted in contact with a vanadium oxide-silicic acid catalyst (8.9% of $V_2O_5$) with a loading of 10,000 parts by volume (S.T.P.) of gas per hour per part by volume of catalyst and at a temperature of 220° C. The gas leaving the catalyst contains 0.09% of nitrogen oxides (79% removal). Increase of the temperature to 270° C. improved the said value to 91.4%. (With the pure carrier (silicic acid without any metal oxide) the removal is only 16.5%.) At a space velocity of 5000 and a catalyst temperature of 210° C., only 0.028% of nitrogen oxides is contained in the purified gas, equivalent to a removal of 93.5%.

EXAMPLE 3

A current of gas consisting of 4.0% by volume of oxygen, 0.38% by volume of nitrogen monoxide, 0.40% of ammonia, the remainder being nitrogen, is passed at a rate of flow of 150 liters per hour (S.T.P.) through a vanadium–$\alpha$-$Al_2O_3$ catalyst (10 ccm.) which has been prepared by treating the catalyst specified in Example 1 with hydrogen at 600° C. for two days. At an inlet temperature of 246° C., the reacted gas mixture contains practically no nitrogen monoxide (less than 10 p.p.m. NO). At 214° C., the NO removal is 95.5%.

EXAMPLE 4

Immediately before entering a catalyst filling, a gas mixture having the composition 95.45% of nitrogen, 4.2% of oxygen and 0.35% of nitrogen dioxide has added to it 0.55% of ammonia and the mixture is then passed through the charge of 10 ccm. of the catalyst specified in Example 1 at a space velocity of 10,000 and at 290° C. Removal of nitrogen dioxide is still more than 97% after uninterrupted operation for more than four hundred hours. The amount of ammonia stoichiometrically required for complete reaction of the ammonia with the nitrogen dioxide is 0.47%. The excess of ammonia is therefore only about 17% relative to the stoichiometric amount required for complete reaction. Adequate purification is also achieved at inlet temperatures lower than 290° C. Operating temperatures higher than 250° C. are however recommended in the interests of prolonged activity of the catalyst and avoidance of salt deposits behind the catalyst.

EXAMPLE 5

A branch stream of the waste gas from a nitric acid manufacturing plant which has an oxygen content of 2.9 to 3.3% by volume and the nitrogen oxide contents specified in Table 1, about 30% thereof being the nitrogen dioxide fraction, the remainder being nitrogen and water vapor (saturation with water vapor at 28° C.), is mixed with the amounts of ammonia specified in Table 1 and passed at a rate of 500 liters per hour (measured at atmospheric pressure and 28° C.) at the temperatures specified in the table and at atmospheric pressure through an alloy steel tube containing 25 or 50 ccm. of a vanadium (V) oxide–$\alpha$-$Al_2O_3$ catalyst (see Example 1). The total nitrogen oxide analyses after reaction is shown by the effect of the catalyst set out in the table. The addition of less than the amount of ammonia equivalent to the nitrogen oxides is included in the table merely for purposes of comparison. Operation in this way is outside the scope of the invention.

Table 1

| Space velocity | 20,000 | 20,000 | 10,000 | 10,000 |
|---|---|---|---|---|
| Temperature, °C.: | | | | |
| Prior to catalyst | 235 | 351 | 298 | 350 |
| In the catalyst | 285 | 382 | 333 | 372 |
| Ammonia (percent by volume) | 0.50 | 0.50 | 0.50 | 0.25 |
| Percent of nitrogen oxide equivalent | 219 | 248 | 165 | 82 |
| Percent by volume of $NO+NO_2$: | | | | |
| At the inlet | 0.260 | 0.235 | 0.350 | 0.345 |
| At the outlet | 0.021 | 0.009 | 0.010 | 0.075 |
| Percent degree of removal | 91.5 | 96.2 | 97.1 | 78.3 |

EXAMPLE 6

A supported catalyst containing about 10% by weight of molybdenum (VI) oxide, when brought into contact with a gas mixture having a nitrogen oxides content of 0.30% by volume and an ammonia content of 0.80% by volume at a volumetric rate of 3000 and a temperature of 398° C., effects a decrease in the nitrogen oxides content of 0.06% (80% removal of nitrogen oxides).

EXAMPLE 7

Reaction of a gas mixture corresponding to that in Example 1 in contact with a tungsten (VI) oxide catalyst (metal oxide content: 100%) gives the results shown in Table 2:

Table 2

| Space velocity | 10,000 | 10,000 | 10,000 | 5,000 |
|---|---|---|---|---|
| Inlet temperature, °C | 220 | 273 | 288 | 323 |
| Percent by volume of ammonia | 0.43 | 0.43 | 0.43 | 0.27 |
| Percent of NO equivalent | 150 | 150 | 150 | 95 |
| Percent of NO removal | 41.18 | 81.4 | 99.7 | 90.7 |

We claim:
1. A process for the selective removal of nitrogen oxides from gas mixtures containing oxygen which comprises: reducing said nitrogen oxides by adding to said gas mixtures at least the amount of ammonia required for stoichiometric reaction, said ammonia being added to said gas mixtures in the presence of a catalyst selected from the group consisting of vanadium oxide, molybdenum oxide, tungsten oxide and mixtures thereof and at a temperature of the gas mixture of from 150° to 400° C. prior to the reduction and with a throughput rate of 3,000 to 80,000 parts per volume (S.T.P.) of the gas mixture per part by volume of the catalyst.

2. A process as claimed in claim 1 wherein the catalyst is vanadium (V) oxide.

3. A process as claimed in claim 1 wherein the catalyst is molybdenum (VI) oxide.

4. A process as claimed in claim 1 wherein the catalyst is tungsten (VI) oxide.

References Cited by the Examiner
UNITED STATES PATENTS 2,119,565  6/1938  Williams _____ 23—212
2,910,343  10/1959  Childers et al. _____ 23—2
2,975,025  3/1961  Cohn et al. _____ 23—2

OSCAR R. VERTIZ, *Primary Examiner.*

EARL C. THOMAS, *Assistant Examiner.*

UNITED STATES PATENT OFFICE
CERTIFICATE OF CORRECTION

Patent No. 3,279,884                         October 18, 1966

Helmut Nonnenmacher et al.

It is hereby certified that error appears in the above numbered patent requiring correction and that the said Letters Patent should read as corrected below.

Column 4, TABLE 2, second column, line 5 thereof, for "41.18" read -- 41.8 --.

Signed and sealed this 12th day of September 1967.

(SEAL)
Attest:

ERNEST W. SWIDER                         EDWARD J. BRENNER
Attesting Officer                             Commissioner of Patents